US012461512B2

(12) United States Patent
Angelosante et al.

(10) Patent No.: US 12,461,512 B2
(45) Date of Patent: Nov. 4, 2025

(54) COATING PROCESS AND QUALITY CONTROL OF COATED OBJECTS

(71) Applicant: ABB Schweiz AG, Baden (CH)

(72) Inventors: Daniele Angelosante, Turgi (CH); Jacobus Lodevicus Martinus Van Mechelen, Regensdorf (CH); Deran Maas, Zürich (CH); Giorgio Signorello, Zürich (CH); Marco Guerriero, Baden (CH)

(73) Assignee: ABB Schweiz AG, Baden (CH)

( * ) Notice: Subject to any disclaimer, the term of this patent is extended or adjusted under 35 U.S.C. 154(b) by 517 days.

(21) Appl. No.: 17/310,357

(22) PCT Filed: Feb. 4, 2019

(86) PCT No.: PCT/EP2019/052646
§ 371 (c)(1),
(2) Date: Jul. 29, 2021

(87) PCT Pub. No.: WO2020/160746
PCT Pub. Date: Aug. 13, 2020

(65) Prior Publication Data
US 2022/0107631 A1 Apr. 7, 2022

(51) Int. Cl.
*B05B 13/04* (2006.01)
*B05B 12/08* (2006.01)
(Continued)

(52) U.S. Cl.
CPC ...... *G05B 19/41875* (2013.01); *B05B 12/084* (2013.01); *B05B 13/0452* (2013.01); *G01B 11/0616* (2013.01); *G05B 2219/32368* (2013.01)

(58) Field of Classification Search
None
See application file for complete search history.

(56) References Cited

U.S. PATENT DOCUMENTS 6,528,109 B1 * 3/2003 Filev ................ B05B 12/12
118/712
7,171,394 B2 * 1/2007 Filev ................ G05B 13/027
706/903
(Continued)

FOREIGN PATENT DOCUMENTS

CN  104807496 A  7/2015
CN  108571934 A  9/2018
(Continued)

OTHER PUBLICATIONS

Aldrete, Stephanie. Virtual Commissioning with the digital twin. Siemans Digital Industries Software blog. Feb. 20, 2017. Retrieved Jul. 25, 2024.*
(Continued)

*Primary Examiner* — David P Turocy
(74) *Attorney, Agent, or Firm* — Whitmyer IP Group LLC

(57) ABSTRACT

A method for modelling a coating process including a plurality of coating parameters, includes the steps of: dispensing, by the coating process and during K work cycles, a coating on each of K pieces of objects to thereby obtain K pieces of coatings; recording, during each of the K work cycles, coating variable values of p coating parameters at M instances to thereby obtain recording results; and measuring at least one coating property at m locations of each of the K pieces of coatings to thereby obtain measurement results. The method is characterized by the step of determining a digital twin of the coating process on the basis of the recording results and the measurement results. By using results from a large amount of classical quality control measurements together with corresponding coating parameter information, a digital twin of the coating process can be determined through statistical processing of such big data. The digital twin may be used either for automatic adjustment of the coating parameters to obtain an improved coating (Continued)

quality, for prediction of the coating quality right after a work cycle to obtain an improved quality control, or for both.

10 Claims, 2 Drawing Sheets

(51) Int. Cl.
  *G05B 19/418* (2006.01)
  *G01B 11/06* (2006.01)

(56) References Cited

U.S. PATENT DOCUMENTS

| | | | | |
|---|---|---|---|---|
| 10,323,932 | B1* | 6/2019 | Adams | G01B 11/0625 |
| 2005/0096796 | A1* | 5/2005 | Filev | G05B 13/027 |
| | | | | 700/283 |
| 2018/0149634 | A1 | 5/2018 | Dattilo et al. | |
| 2019/0243933 | A1* | 8/2019 | Roemerman | G06N 20/20 |

FOREIGN PATENT DOCUMENTS

| | | | | |
|---|---|---|---|---|
| EP | 198497 | A2 | 10/1986 | |
| EP | 2899498 | A1 | 7/2015 | |
| JP | 2000180308 | A * | 6/2000 | B05B 12/004 |
| JP | 2002365213 | A | 12/2002 | |
| WO | 2009069396 | A1 | 6/2009 | |

OTHER PUBLICATIONS

International Search Report and Written Opinion of the International Searching Authority; Application No. PCT/EP2019/052646; Completed: Apr. 1, 2019; Mailing Date: Apr. 11, 2019; 12 Pages.
Chinese Office Action and Search Report; Application No. 2019800896706; Completed Oct. 8, 2022; 12 Pages.

* cited by examiner

COATING PROCESS AND QUALITY CONTROL OF COATED OBJECTS

TECHNICAL FIELD

The present invention relates to coating, such as painting, of objects in a painting line. The present invention further relates to quality control of the coated objects.

BACKGROUND

Paint coatings on e.g. vehicle bodies need to abide to stringent requirements: the color distribution must be homogeneous, the surface must be smooth and without particles such as dust, and minimum thickness levels of individual and overall layer thicknesses are required to protect from corrosion and UV radiation. Furthermore, the coating process has to be cost effective in the sense that minimum material waste is guaranteed.

High-end measurements using state-of-the-art techniques are implemented in demanding testing procedures to assess the coating quality of paint coatings on vehicle bodies. It is conventionally known to perform quality control of a painted vehicle body by taking multiple measurements at selected coordinates in a manual or automatic fashion. The sensor technology adopted for the task can vary from simple magnetic induction to more advanced optical spectroscopy using THz sensors, known as such e.g. from EP2899498A1. The process of assessing the quality of a paint coating can be very lengthy, expensive, and prone to errors.

It is well known in the art to provide painting lines with a plurality of subsequent paint booths configured to dispense different coatings on objects transported through the painting line on a conveyor. Each paint booth typically comprises a painting system with at least one painting robot carrying a paint dispenser, a paint delivery system containing the paint itself, and a controller controlling the operations of the different parts of the painting system including regulation of coating parameters of the same. The coating parameters may comprise paint volume flow, spraying air flow, shaping air flow, bell speed, electrical charge of the paint haze, robot position, robot speed, paint viscosity, paint colour, etc.

It is desirable to adjust the coating parameters such as to improve the coating process to achieve enhanced coating quality. For instance, if a systematic problem at a specific coating location is observed, most likely the coating process around that specific location requires further optimization (i.e. more paint, different robot path, different robot speed, etc.). However, classical quality control can only localize process critical issues, but cannot provide measures to optimize the coating process.

There remains a desire to improve the existing coating methods to achieve improved coating process and an improved quality control of the coated objects.

SUMMARY

One object of the invention is to provide an improved modelling of a coating process comprising a plurality of coating parameters.

A further object of the invention is to provide an improved coating process.

A further object of the invention is to provide an improved quality control of the coated objects.

A yet further object of the invention is to provide an improved painting line.

These objects are achieved by the methods and the device according to the present invention.

The invention is based on the realization that by using results from a large amount of classical quality control measurements together with corresponding coating parameter information, a digital twin of the coating process can be determined through statistical processing of such big data. The digital twin may be used either for automatic adjustment of the coating parameters to obtain an improved coating quality, for prediction of the coating quality right after a work cycle to obtain an improved quality control, or for both.

According to a first aspect of the invention, there is provided a method for modelling a coating process comprising a plurality of coating parameters, the method comprising the steps of: dispensing, by means of the coating process and during K work cycles, a coating on each of K pieces of objects to thereby obtain K pieces of coatings; recording, during each of the K work cycles, coating variable values of p coating parameters at M instances to thereby obtain recording results; and measuring at least one coating property at m locations of each of the K pieces of coatings to thereby obtain measurement results. The method further comprises the step of determining a digital twin of the coating process on the basis of the recording results and the measurement results.

According to one embodiment of the invention, K>100, such as K>1000.

According to one embodiment of the invention, M>1000, such as M>10000.

According to one embodiment of the invention, m>10, such as m>100.

According to one embodiment of the invention, the recording results comprise coating variable values of at least one arbitrary parameter.

According to one embodiment of the invention, the at least one arbitrary parameter comprises a coating parameter measured by means of a microphone or by means of a camera.

According to a second aspect of the invention, there is provided a method for optimizing a coating process, the method comprising the steps of: modelling the coating process according to any of the above embodiments; providing a first coating variable value of at least one first coating parameter; and calculating, on the basis of the first coating variable value and the digital twin, a second coating variable value for at least one second coating parameter, the at least one second coating parameter being different from the at least one first coating parameter.

According to one embodiment of the invention, the method further comprises the steps of: automatically adjusting the at least one second coating parameter on the basis of the calculated second coating variable value to thereby obtain an adjusted second coating variable value; and dispensing, by means of the coating process, a coating on an object using the adjusted second coating variable value.

According to one embodiment of the invention, the at least one first coating parameter is not adjusted.

According to one embodiment of the invention, the first coating parameter value is constant during the work cycle.

According to a third aspect of the invention, there is provided a method for quality controlling coated objects, the method comprising the steps of: modelling a coating process according to any of the above embodiments; dispensing, by means of the coating process, a coating on an object using a first coating variable set; and predicting, on the basis of at least one coating variable value and the digital twin, at least one coating property value for at least one coating property.

According to one embodiment of the invention, the method further comprises the steps of: comparing the at least one coating property value with at least one reference value for the at least one coating property; and determining, on the basis of the comparison, whether the coating process was successful or not.

According to one embodiment of the invention, the at least one coating property comprises overall thickness of the coating or an individual thickness of at least one coating layer.

According to a third aspect of the invention, there is provided a painting line for carrying out a coating process, the painting line comprising: at least one painting system configured to dispense coating on objects during a plurality of work cycles, at least one recording instrument configured to record coating variable values to thereby obtain recording results, and at least one measuring instrument configured to measure at least one coating property to thereby obtain measurement results. The painting line further comprises a controller configured to carry out a method according to any of the above embodiments.

BRIEF DESCRIPTION OF THE DRAWINGS

The invention will be explained in greater detail with reference to the accompanying drawings, wherein.

DETAILED DESCRIPTION

Figure 1:
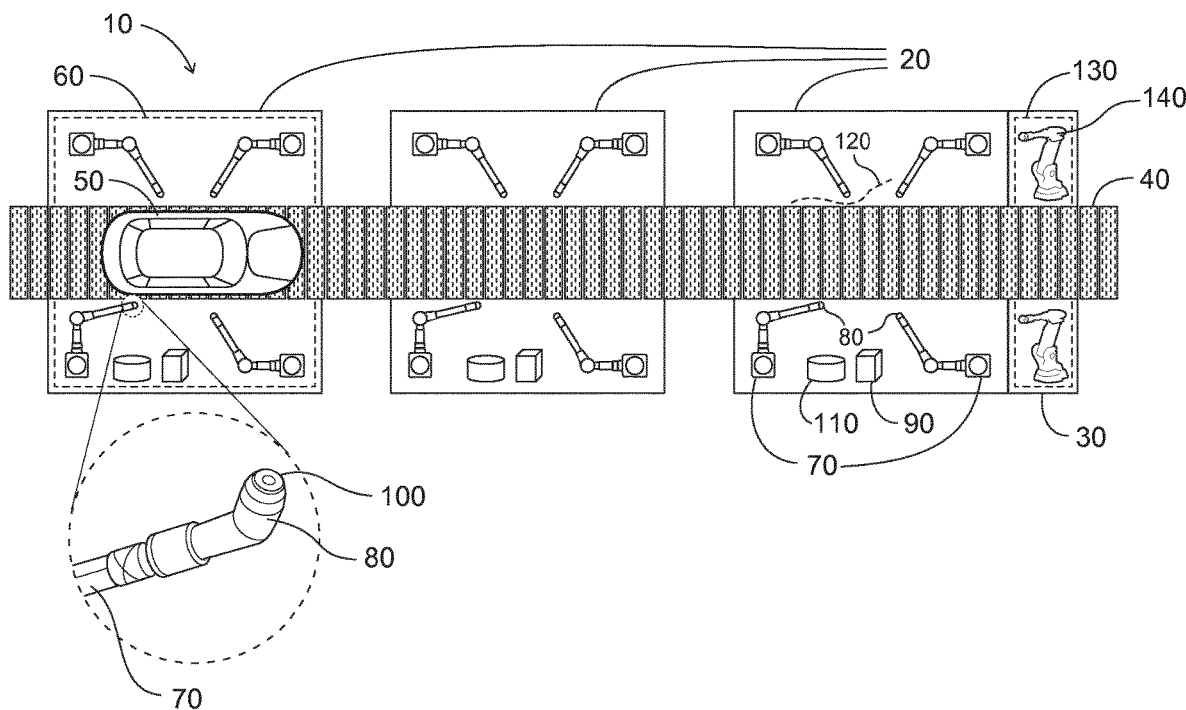
FIG. 1 shows a painting line according to one embodiment of the invention.

Referring to FIG. 1, a painting line 10 according to one embodiment of the invention comprises three paint booths 20 arranged one after another. There is a measurement station 30 after the last paint booth 20. A conveyor 40 continuously transports vehicle bodies 50 to be painted through the painting line 10, and each paint booth 20 comprises a painting system 60 configured to dispense a layer of paint or other coating on the vehicle bodies 50. The first painting system 60 may for example be configured to dispense a first base coat, the second painting system 60 may be configured to dispense a second base coat, and the third painting system 60 may be configured to dispense a first clear coat on the vehicle bodies 50. In addition to the shown paint booths 20 and the measurement station 30 the painting line 10 may comprise additional paint booths 20 and measurement stations 30, flash-off zones, ovens, and other painting line elements known as such in the technical field of painting.

Each painting system 60 may comprise an appropriate number of painting robots 70 each equipped with a paint atomizer 80, and a controller 90 controlling the operations of the different parts of the painting system 60 including regulation of coating parameters of the same. Each paint booth 20 may also be considered as part of the respective painting system 60 provided that some parameters of the paint booth 20, such as the booth temperature, booth humidity and booth pressure (temperature, humidity and pressure of the air within the paint booth 20), affecting the resulting coating, are regulated by the respective controller 90.

Each paint atomizer 80 may for example be of a bell type, wherein a bell-shaped atomizing head 100 rotates at a high speed to turn a liquid paint delivered to the atomizing head 100 into small droplets directed towards the vehicle body 50 to be painted. Each paint atomizer 80 may furthermore be designed for electrostatic painting, wherein the paint atomizer 80 comprises at least one electrode (not shown) charged with high electric voltage. Such paint atomizers 80 are well known in the art e.g. from WO2009069396A1. The paint is delivered to the atomizing head 100 by a respective paint delivery system containing a reservoir 110 and at least one pump (not shown). The volume flow of each different paint or other coating to be dispensed can be regulated by means of the controller 90. The properties of each paint can be regulated e.g. by adding agents in the respective reservoir 110 or by regulating the temperature of the same.

However, even if an example of a painting system 60 is here disclosed to a certain detail, the compositions of the painting systems 60 are not interesting or significant for the present invention. The above example of a painting system 60 is there merely to illustrate that depending on the painting system 60 there is a large number of all kinds of coating parameters affecting the resulting coating. In the case of the above example at least the following coating parameters can be identified: robot positions constituting a robot path 120, robot speed, rotational speed of an atomizing head 100, electrical charge of a paint haze tuned by a voltage level at the respective electrode, volume flow of paint, paint viscosity, paint colour, paint temperature, booth temperature, booth humidity and booth pressure.

It is to be understood that an arbitrary painting system 60 does not need to comprise all the coating parameters mentioned here, and that it may comprise many additional coating parameters not mentioned here. In the context of the present disclosure all parameters that affect the resulting coating shall be considered as "coating parameters". Moreover, the coating parameters are divided into the following four categories depending on their nature. A "controller parameter" is a coating parameter that can be regulated by means of a controller 90, the robot path 120 being an example of a controller parameter. An "environmental parameter" is a coating parameter that can be measured but not controlled, the booth pressure (unless controllable) being an example of an environmental parameter. Environmental parameters can be considered to be constant during each work cycle, and they can therefore be measured right before, during or right after each work cycle. An "arbitrary parameter" is a coating parameter that can be measured only during each work cycle, and that cannot be controlled. An arbitrary parameter can be an indicator used to distinguish correct function of the painting system 60 from incorrect one, a nozzle noise measured by means of a microphone distinguishing a clean nozzle from a clogged one, and a paint haze distribution measured by means of a high-speed camera distinguishing a healthy distribution from an unhealthy one being examples of arbitrary parameters. A "set parameter" is a coating parameter that can be considered to be constant during all work cycles, and that cannot be controlled and does not always even need to be measured as the information may be known from specifications. A paint colour and a nozzle diameter are examples of set parameters, and they are introduced to the respective controller 90 at need.

It is also to be understood that the values of at least some coating parameters may vary during work cycles. In the context of the present disclosure a "coating variable set" shall be considered to comprise all the values (even those that remain constant) of all respective coating parameters over a work cycle, a "coating variable" shall be considered to comprise all the values (even those that remain constant) of a single coating parameter over a work cycle, and a "coating variable value" shall be considered to comprise an instant value of a single coating parameter during a work cycle. A "work cycle" shall be considered to comprise all operations executed at different parts of the painting line 10 to achieve a complete coating on a vehicle body 50.

Further referring to FIG. 1, the first painting system 60 may be configured to dispense a first base coat on a vehicle body 50 using a first coating variable set $X_k$. As soon as this is done, the conveyor 40 transports the vehicle body 50 (possibly via a flash-off zone, a furnace, a measurement station 30, or another additional painting line element) into the second paint booth 20 which may comprise a second painting system 60 substantially identical with the first painting system 60. The second painting system 60 may be configured to dispense a second base coat on the first base coat (and on the vehicle body 50) using a second coating variable set $X_k$. As soon as this is done, the conveyor 40 transports the vehicle body 50 into the third paint booth 20 which may comprise a third painting system 60 substantially identical with the first and second painting systems 60. The third painting system 60 may be configured to dispense a first clear coat on the second base coat (and on the vehicle body 50) using a third coating variable set $X_k$.

As soon as the third painting system 60 has dispensed the first clear coat on the second base coat, the conveyor 40 transports the vehicle body 50 to the measurement station 30. The measurement station 30 may comprise a measurement system 130 with an appropriate number of THz sensors (not shown) emitting THz radiation towards the vehicle body 50 and detecting the returning radiation having interacted with the three coating layers and the vehicle body 50. Each THz sensor is carried by a measuring robot 140 moving the respective sensor in relation to the vehicle body 50 to make measurements at a plurality of predetermined locations of the same, such as at m locations, where m can e.g. be an integer between 10 and 100.

The measurement system 130 may be configured to measure, for each vehicle body 50, at least the overall thickness of the three coating layers at the m locations, and thereby coating property vectors $\bar{y}_{jk}$ each containing m coating property values $y_{i,j}$, may be obtained as measurement results, the index j referring to a certain coating property (j running from 1 to n) and the index k referring to a certain vehicle body 50 (k running from 1 to K). Preferably also additional coating properties such as the individual thickness of each of the three coating layers, colour, gloss and paint composition are measured, and thereby the measurement results may comprise coating property sets $Y_k$ in the form of coating property matrices $Y_k$ the columns of which correspond to n different coating properties and the rows of which correspond to the m different measurement locations with the respective m coating property values $y_{i,j}$. When the measurement is repeated for a plurality of vehicle bodies 50, such as for K pieces of vehicle bodies 50, K pieces of coating property matrixes $Y_k$ are obtained:

$$Y_{k=1}^{K} = \begin{bmatrix} y_{1,1} & \cdots & y_{1,n} \\ \vdots & \ddots & \vdots \\ y_{m,1} & \cdots & y_{m,n} \end{bmatrix}_k$$

Figure 2:
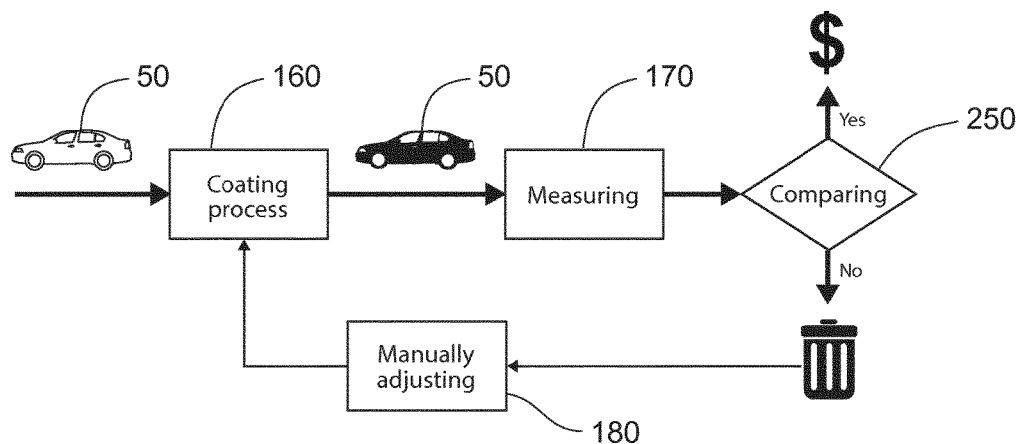
FIG. 2 shows a conventional coating process and a quality control method.

This far, the description above related to FIG. 1 discloses a conventional painting line 10 with a conventional quality control method illustrated in FIG. 2. That is, at the end of the painting line 10, after the coating process 160, measuring 170 is carried out to determine whether the subject coating satisfies the quality requirements, or whether the vehicle body 50 needs to be reworked or even destructed. The determination can be based on comparison 250 of a certain coating property value ($y_{i,j}$) with a respective reference value ($y_{ref}$). At the same time the measurement results $\bar{y}_{jk}$, $Y_k$ can be used for manually adjusting 180 the coating variable values ($x_{i,j}$). This adjustment is conventionally made manually by an experienced human operator and not automatically by a controller 90.

Figure 3:
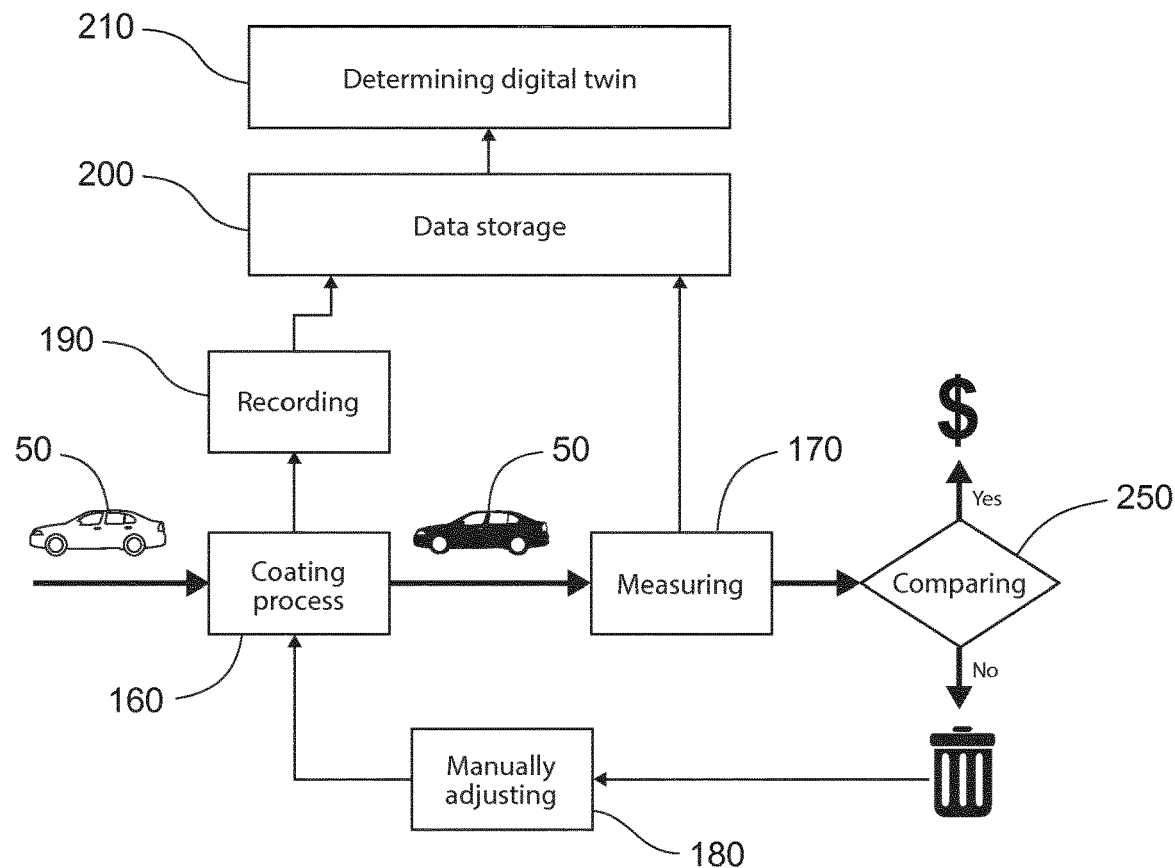
FIG. 3 shows the conventional coating process and the quality control method of FIG. 2 adapted for determining a digital twin according to one embodiment of the invention.

Referring to FIG. 3, according to the present invention coating variable values $x_{i,j}$ of a plurality of coating parameters are recorded 190 at a plurality of instances during each work cycle, such as at M instances, where M can e.g. be an integer between 1000 and 100000. Thereby, coating variables $\bar{x}_{jk}$ in the form of coating variable vectors $\bar{x}_{jk}$, each containing M coating variable values $x_{i,j}$, are obtained as recording results, the index j referring to a certain coating parameter (j running from 1 to p) and the index k referring to a certain work cycle (k running from 1 to K). Each painting system 60 may be configured to record 190 coating variable values $x_{i,j}$ of p coating parameters at M instances, and thereby the recording results may comprise coating variable sets $X_k$ in the form of coating variable matrices $X_k$ the columns of which correspond to p different coating parameters and the rows of which correspond to the M instances with the respective M coating variable values $x_{i,j}$. When the recording 190 is repeated for a plurality of work cycles, such as for K work cycles, where K can e.g. be an integer between 100 and 10000, K pieces of coating variable matrices $X_k$ are obtained:

$$X_{k=1}^{K} = \begin{bmatrix} x_{1,1} & \cdots & x_{1,p} \\ \vdots & \ddots & \vdots \\ x_{M,1} & \cdots & x_{M,p} \end{bmatrix}_k$$

After executing the aforementioned steps of measuring 170 and recording 190 for K work cycles, and after saving the measurement results $\bar{y}_{jk}$, $Y_k$ and the recording results $\bar{x}_{jk}$, $X_k$ in a data storage 200, coating property matrices $Y_k$ and coating variable matrices $X_k$ will be available for k=1, . . . , K. A reasonable assumption is that each coating property set $Y_k$ depends on the respective coating variable set $X_k$. Making this assumption implies that there exists an unknown function f such that $Y_k = f(X_k)$. The function f and its approximation f' represent a "digital twin" 220 of the coating process 160. To determine 210 the digital twin 220 one needs to find at least an approximation f' of the unknown function f such that $Y_k$ is close to $f(X_k)$ for k=1, . . . , K i.e. $Y_k = f'(X_k) \approx f(X_k)$, which as such is a well-known problem within the statistical community known e.g. from J. Friedman, T. Hastie, R. Tibshirani, "The elements of statistical learning," Springer, 2001, and which can be solved by means of a regression analysis. Several techniques can be applied to the solve the problem ranging from linear regression, neural networks, Gaussian process, Gaussian mixture models, etc. It is assumed that a person skilled in the art is capable of performing a regression analysis when appropriate data is available.

Figure 4:
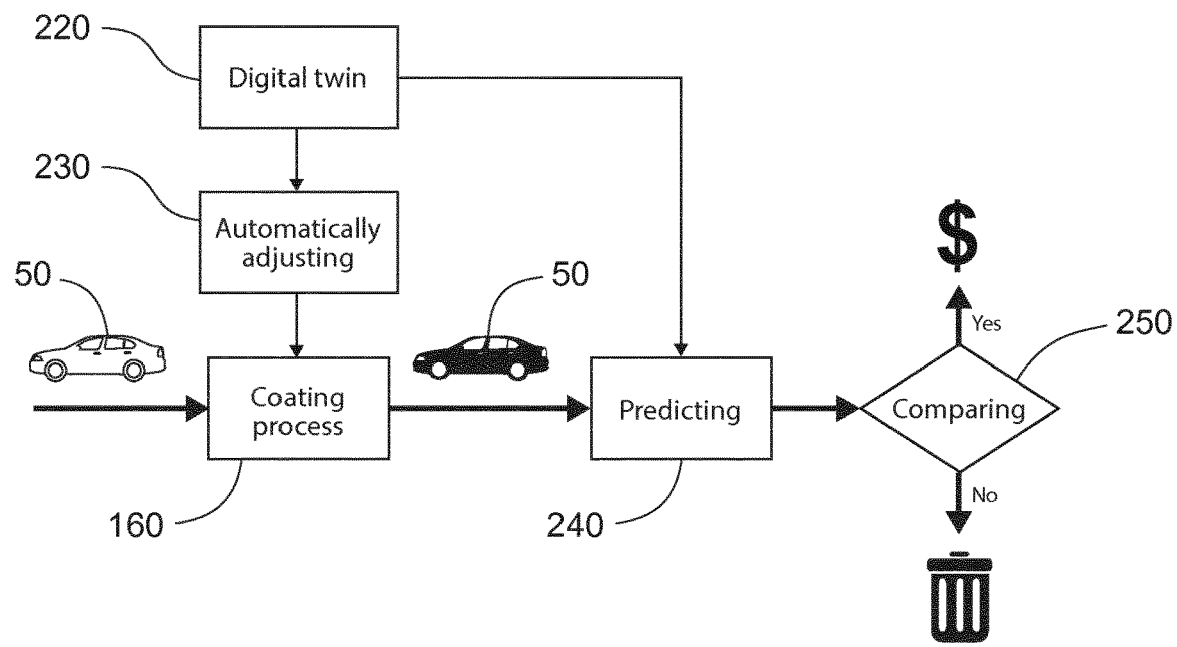
FIG. 4 shows a coating process and a quality control method according to one embodiment of the invention.

Referring to FIG. 4, once the digital twin 220 is known, it can be used to optimize the coating variable sets $X_k$ to provide a desired coating property set $Y_k$. For example, depending on the values of the environmental parameters (that cannot be regulated), it may be possible to automatically adjust 230 the controller parameters and/or the set parameters to compensate for one or more undesired environmental parameter values such that a desired coating quality is achieved. The digital twin 220 also allows performing process optimization e.g. through simulation of a large number of different coating variable sets $X_k$ and using the one that gives the best results.

Furthermore, the digital twin 220 may be used in quality control purpose for prediction 240 of the coating quality right after a work cycle. Such prediction 240 may replace or complement a conventional quality control made by means of measurements. For example, a coating on a vehicle body 50 may be dispensed using a first coating variable set $X_k$. Those coating variables $\bar{x}_{jk}$ that represent arbitrary parameters can only be measured during the work cycle, but immediately after the work cycle is finished the digital twin 220 can be used to calculate the respective coating property values $y_{i,j}$. On the basis of that calculation, instead of the conventional quality control, it can be determined whether the subject coating satisfies the quality requirements or not. For example, the determination can be based on comparison 250 of a certain coating property value ($y_{i,j}$) with a respective reference value ($y_{ref}$).

The invention is not limited to the embodiments shown above, but the person skilled in the art may modify them in a plurality of ways within the scope of the invention as defined by the claims.

The invention claimed is:

1. A method for optimizing a coating process comprising a plurality of coating parameters and being performed by a painting line, the painting line including at least one painting system configured to dispense a coating on objects, the painting system having at least one robot and a controller controlling operations of the painting system, the method comprising modelling the coating process by performing the steps of:
   dispensing using the at least one robot, by means of the coating process and during K work cycles, a coating on each of K pieces of objects to thereby obtain K pieces of coatings;
   recording, during each of the K work cycles, coating variable values ($x_{i,j}$) of p coating parameters at M instances to thereby obtain recording results ($\bar{x}_{jk}$, $X_k$);
   measuring at least one coating property at m locations of each of the K pieces of coatings to thereby obtain measurement results ($\bar{y}_{jk}$, $Y_k$);
   determining a digital twin of the coating process on the basis of the recording results ($\bar{x}_{jk}$, $X_k$) and the measurement results ($\bar{y}_{jk}$, $Y_k$), wherein the digital twin represents an approximation f' of an unknown function f from coating variables to coating properties, wherein the approximation is such that $Y_k=f(X_k)\approx f'(X_k)$;
   the method further comprising:
   providing a first coating variable value of at least one first coating parameter, the at least one first coating parameter representing an arbitrary parameter which is not regulable;
   calculating, on the basis of the first coating variable value and the digital twin, a second coating variable value for at least one second coating parameter, the at least one second coating parameter being different from the at least one first coating parameter and being regulable; and
   automatically adjusting the controller the second coating variable value to modify the dispensing operation performed by the at least one painting system;
   wherein i is an index referring to one of the M instances, wherein j is an index referring to one of the coating parameters, and wherein k is an index referring to one of the work cycles; and
   wherein K>100, M>1000, and m>10.

2. The method according to claim 1, wherein the recording results ($\bar{x}_{jk}$, $X_k$) comprise coating variable values ($x_{i,j}$) of at least one arbitrary parameter.

3. The method according to claim 2, wherein the at least one arbitrary parameter comprises a coating parameter measured by a microphone or by a camera.

4. The method according to claim 1, wherein the method further comprises the steps of:
   automatically adjusting the at least one second coating parameter on the basis of the calculated second coating variable value ($x_{i,j}$) to thereby obtain an adjusted second coating variable value ($x_{i,j}$); and
   dispensing, by means of the coating process, a coating on an object using the adjusted second coating variable value ($x_{i,j}$).

5. The method according to claim 1, wherein the at least one first coating parameter is not adjusted.

6. The method according to claim 1, wherein the first coating parameter value is constant during the work cycle.

7. The method according to claim 1, further comprising the steps of:
   dispensing, by means of the coating process, a coating on an object using a first coating variable set ($X_k$); and
   predicting, on the basis of at least one coating variable value ($x_{i,j}$) and the digital twin, at least one coating property value ($y_{i,j}$) for at least one coating property.

8. The method according to claim 7, wherein the method further comprises the steps of:
   comparing the at least one coating property value ($y_{i,j}$) with at least one reference value ($y_{ref}$) for the at least one coating property; and
   determining, on the basis of the comparison, whether the coating process was successful or not.

9. The method according to claim 7, wherein the at least one coating property comprises an overall thickness of the coating or an individual thickness of at least one coating layer.

10. The method according to claim 1, wherein said calculating the second coating variable value provides for adjusting the coating parameters so as to improve the coating process to achieve an enhanced coating quality.

* * * * *